(12) United States Patent
Seok

(10) Patent No.: US 9,913,296 B2
(45) Date of Patent: Mar. 6, 2018

(54) METHOD FOR PERFORMING BACKOFF IN WIRELESS LAN SYSTEM AND APPARATUS THEREFOR

(71) Applicant: LG ELECTRONICS INC., Seoul (KR)

(72) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 285 days.

(21) Appl. No.: 14/760,452

(22) PCT Filed: Oct. 30, 2013

(86) PCT No.: PCT/KR2013/009741
§ 371 (c)(1),
(2) Date: Jul. 10, 2015

(87) PCT Pub. No.: WO2014/112707
PCT Pub. Date: Jul. 24, 2014

(65) Prior Publication Data
US 2016/0007379 A1  Jan. 7, 2016

Related U.S. Application Data

(60) Provisional application No. 61/752,998, filed on Jan. 16, 2013, provisional application No. 61/753,445,
(Continued)

(51) Int. Cl.
*H04B 7/00* (2006.01)
*H04W 74/08* (2009.01)
*H04W 84/12* (2009.01)

(52) U.S. Cl.
CPC .......... *H04W 74/085* (2013.01); *H04W 84/12* (2013.01)

(58) Field of Classification Search
CPC .......... H04W 74/085; H04W 74/0816; H04W 28/20; H04L 5/001; H04B 7/00
See application file for complete search history.

(56) References Cited

U.S. PATENT DOCUMENTS 8,630,983 B2 * 1/2014 Sengupta .......... G06F 17/30289
707/654
2005/0276276 A1 * 12/2005 Davis ...................... H04L 41/26
370/447
(Continued)

FOREIGN PATENT DOCUMENTS

CN      102413582       4/2012
KR   10-2005-0040454    5/2005
(Continued)

OTHER PUBLICATIONS

Majkowski, et al., "Dynamic TXOP configuration for Qos enhancement in IEEE 802.11e wireless LAN," SoftCOM 2006 International Conference, Sep. 2006, 6 pages.
(Continued)

*Primary Examiner* — Wei Zhao
(74) *Attorney, Agent, or Firm* — Lee Hong Degerman Kang & Waimey

(57) ABSTRACT

The present invention relates to a wireless communication system, and more particularly to a method for enabling a station (STA) to perform a backoff in a wireless LAN system and an apparatus therefor. In a wireless LAN system according to an embodiment of the present invention, a method for enabling a station (STA) to perform a backoff includes the steps of: performing a first backoff procedure at a first primary channel for a transmission of a data unit having a size of a first channel width; performing a second backoff procedure at a second primary channel for a transmission of a data unit having a size equal to or greater than a second channel width; if a transmission opportunity (TXOP) is
(Continued)

permitted as a result of the first backoff procedure, transmitting the data unit having a size of the first channel width; and if a TXOP is permitted as a result of the second backoff procedure, transmitting the data unit having a size equal to or greater than the second channel width.

11 Claims, 19 Drawing Sheets

Related U.S. Application Data filed on Jan. 17, 2013, provisional application No. 61/766,126, filed on Feb. 19, 2013, provisional application No. 61/822,933, filed on May 14, 2013.

(56) References Cited

U.S. PATENT DOCUMENTS

| | | | |
|---|---|---|---|
| 2008/0192644 | A1 | 8/2008 | Utsunomiya et al. |
| 2011/0235599 | A1* | 9/2011 | Nam .................. H04L 1/0027 370/329 |
| 2011/0292919 | A1 | 12/2011 | Trainin et al. |
| 2012/0327870 | A1 | 12/2012 | Grandhi et al. |

FOREIGN PATENT DOCUMENTS

| | | |
|---|---|---|
| KR | 10-2011-0015759 | 2/2011 |
| KR | 10-2011-0116978 | 10/2011 |
| KR | 10-2012-0093320 | 8/2012 |
| WO | 2006/109213 | 10/2006 |
| WO | 2011/060326 | 5/2011 |

OTHER PUBLICATIONS

PCT International Application No. PCT/KR2013/009741, Written Opinion of the International Searching Authority dated Feb. 7, 2014, 13 pages.

Park, et al., "Proposed Specification Framework for TGah", doc.: IEEE 802.11-11/1137r12, XP055166824, Nov. 2012, 50 pages.

Park, et al., "IEEE 802.11 ac: Dynamic Bandwidth Channel Access", XP031908841, Jun. 2011, 5 pages.

European Patent Office Application Serial No. 13872157.6, Search Report dated Jul. 20, 2016, 14 pages.

The State Intellectual Property Office of the People's Republic of China Application No. 201380069183.6, Office Action dated Nov. 30, 2017, 13 pages.

* cited by examiner

METHOD FOR PERFORMING BACKOFF IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2013/009741, filed on Oct. 30, 2013, which claims the benefit of U.S. Provisional Application No. 61/752,998, filed on Jan. 16, 2013, 61/753,445, filed on Jan. 17, 2013, 61/766,126, filed on Feb. 19, 2013 and 61/822,933, filed on May 14, 2013, the contents of which are all hereby incorporated by reference herein in their entirety.

TECHNICAL FIELD

The present invention relates to a wireless communication system, and more particularly, to a method and apparatus for performing backoff in a Wireless Local Area Network (WLAN) system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

Machine to Machine (M2M) communication technology has been discussed as next generation communication technology. A technical standard for supporting M2M communication in IEEE 802.11 WLAN has been developed as IEEE 802.11ah. M2M communication may sometimes consider a scenario capable of communicating a small amount of data at low speed in an environment including a large number of devices.

DISCLOSURE

Technical Problem

An object of the present invention devised to solve the conventional problem is to provide a new backoff scheme applied to a Wireless Local Area Network (WLAN) system having a plurality of primary channels.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for performing backoff by a STAtion (STA) in a Wireless Local Area Network (WLAN) system includes performing a first backoff procedure on a first primary channel having a first channel width, for transmission of a data unit having a size equal to the first channel width, and performing a second backoff procedure on a second primary channel having a second channel width, for transmission of a data unit having a size equal to the second channel width, transmitting the data unit having the size equal to the first channel width, if a Transmission Opportunity (TXOP) is allowed as a result of the first backoff procedure, and transmitting the data unit having the size equal to the second channel width, if a TXOP is allowed as a result of the second backoff procedure.

In another aspect of the present invention, an STA for performing backoff in a WLAN system includes a transceiver and a processor. The processor is configured to perform a first backoff procedure on a first primary channel having a first channel width, for transmission of a data unit having a size equal to the first channel width, to perform a second backoff procedure on a second primary channel having a second channel width, for transmission of a data unit having a size equal to the second channel width, to transmit the data unit having the size equal to the first channel width through the transceiver, if a TXOP is allowed as a result of the first backoff procedure, and to transmit the data unit having the size equal to the second channel width through the transceiver, if a TXOP is allowed as a result of the second backoff procedure.

According to the embodiments of the present invention, the followings may be commonly applied.

If the TXOP is allowed as a result of the first backoff procedure, only the data unit having the size equal to the first channel width may be transmitted.

If the TXOP is allowed as a result of the first backoff procedure, a data unit having a size larger than the first channel width may not be transmitted.

The first channel width may be 1 MHz.

If the TXOP is allowed as a result of the first backoff procedure, the data unit of 1 MHz may be transmitted on the first primary channel.

If the TXOP is allowed as a result of the second backoff procedure, a data unit having a size equal to or larger than the second channel width may be transmitted according to idle state of one or more secondary channels.

The second channel width may be 2 MHz.

If the TXOP is allowed as a result of the second backoff procedure, the data unit of 2 MHz may be transmitted on the second primary channel of 2 MHz.

If the TXOP is allowed as a result of the second backoff procedure and a secondary channel of 2 MHz is idle during a Point Coordination Function (PCF) Interframe Space (PIFS) shortly before the start of the TXOP, a data unit of 4 MHz may be transmitted on the second primary channel of 2 MHz and a secondary channel of 2 MHz.

If the TXOP is allowed as a result of the second backoff procedure and both a secondary channel of 2 MHz and a secondary channel of 4 MHz are idle during a PIFS shortly before the start of the TXOP, a data unit of 8 MHz may be transmitted on the second primary channel of 2 MHz, the secondary channel of 2 MHz, and the secondary channel of 4 MHz.

If a backoff timer value reaches 0 during the first backoff procedure, the TXOP may be allowed as a result of the first backoff procedure.

If a backoff timer value reaches 0 during the second backoff procedure, the TXOP may be allowed as a result of the second backoff procedure.

The STA may be a Sub 1 GHz (S1G) STA.

The data unit may be a Physical Layer Convergence Protocol (PLCP) packet data unit.

The foregoing comprehensive description and following detailed description of the present invention are exemplary and given for additional description of the invention as described in the appended claims.

Advantageous Effects

According to the present invention, an effective backoff method and apparatus applicable to a Wireless Local Area Network (WLAN) system having a plurality of primary channels can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
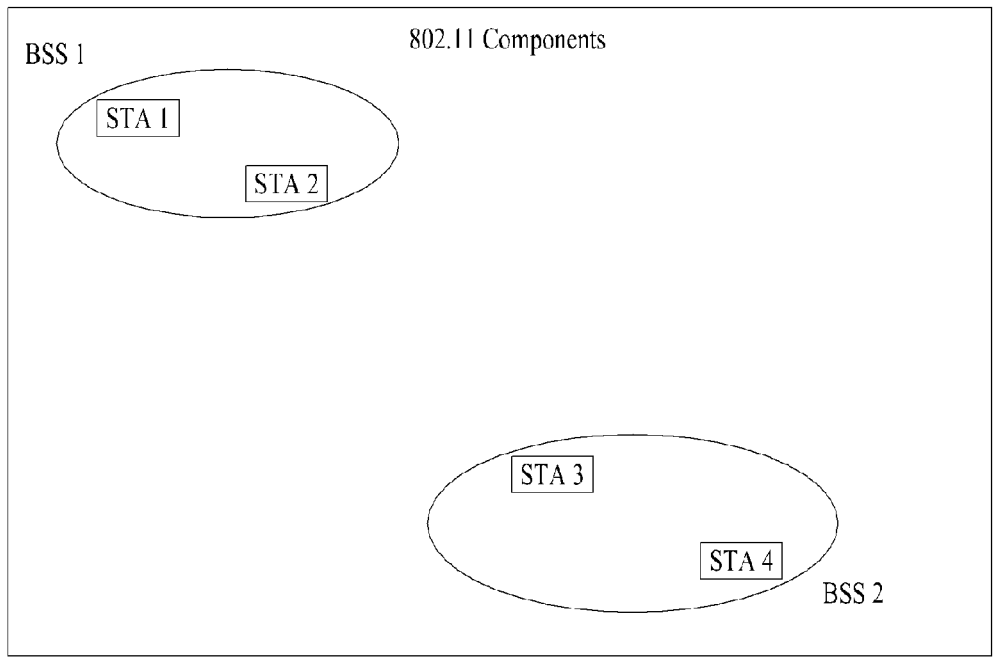
FIG. 1 illustrates exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
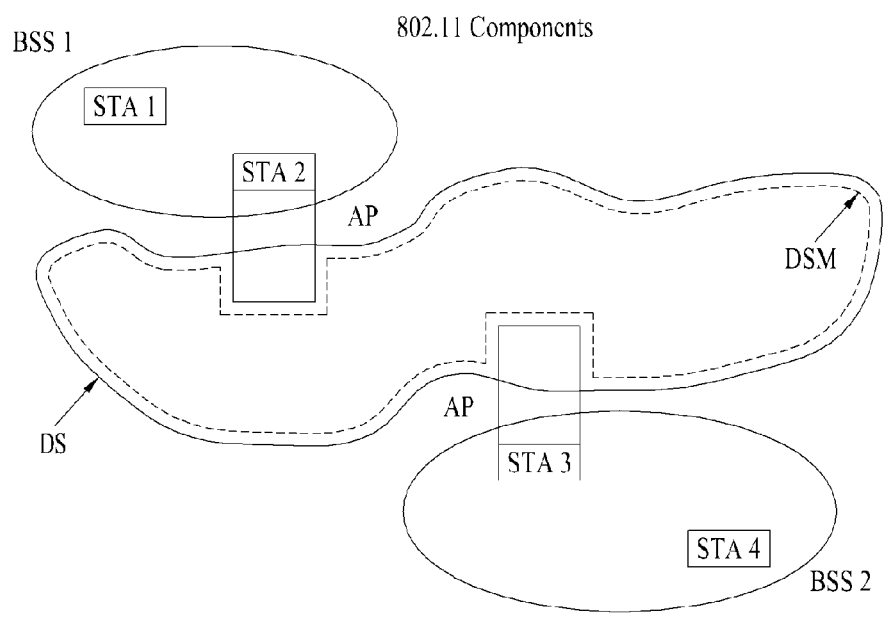
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
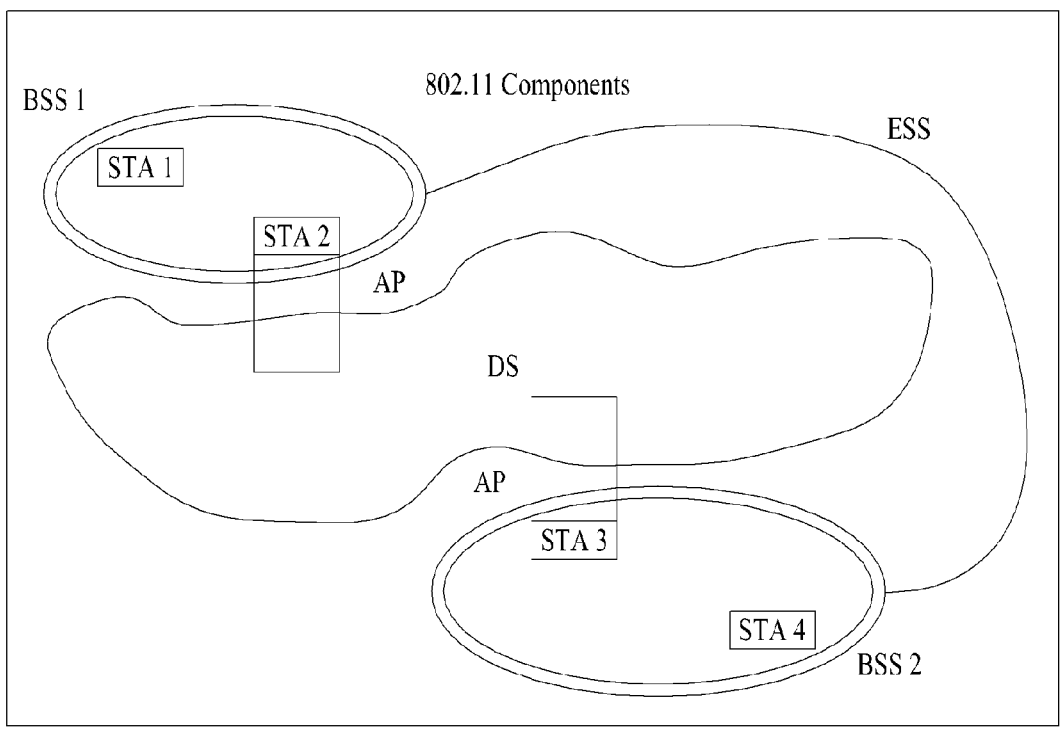
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
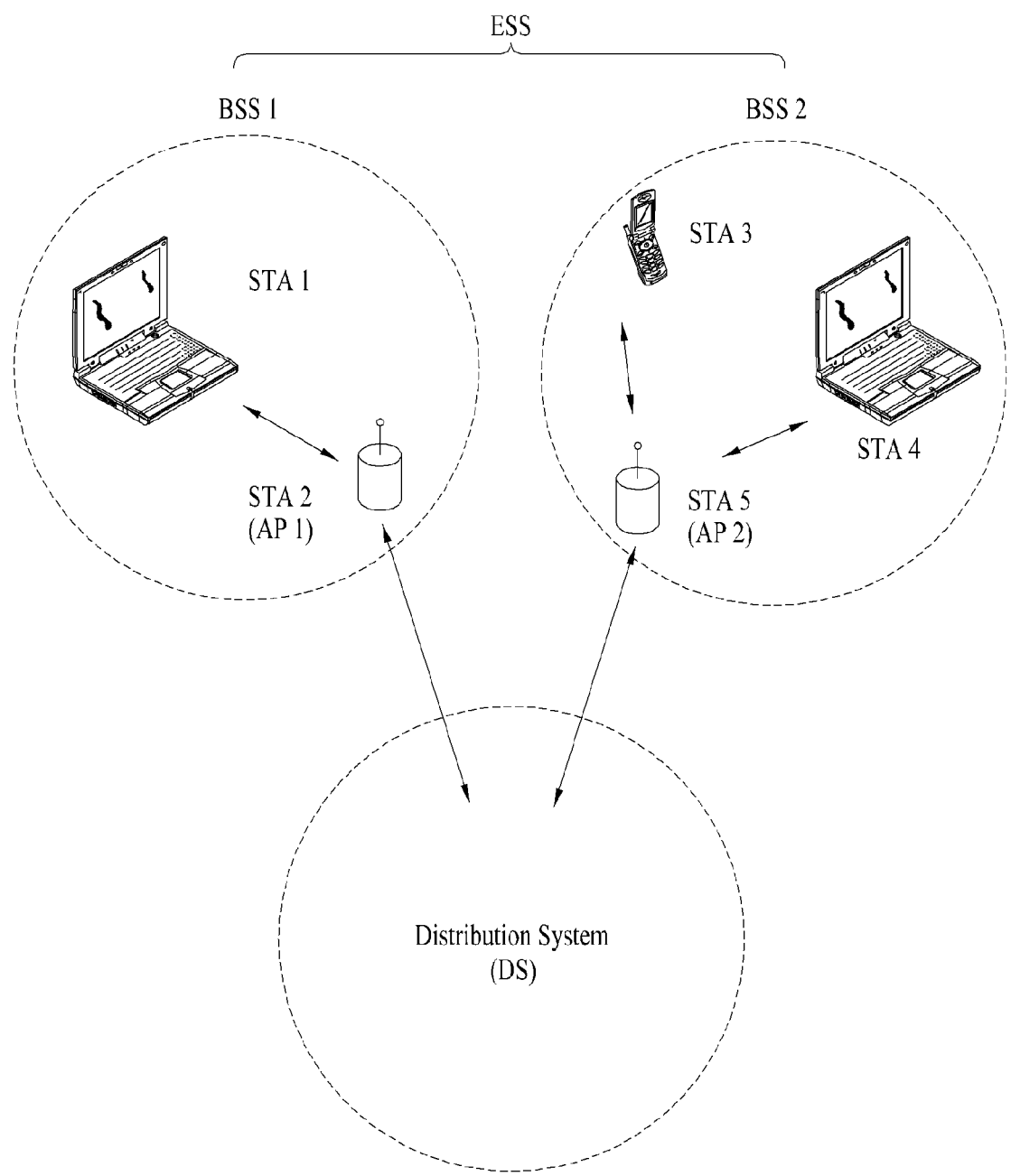
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
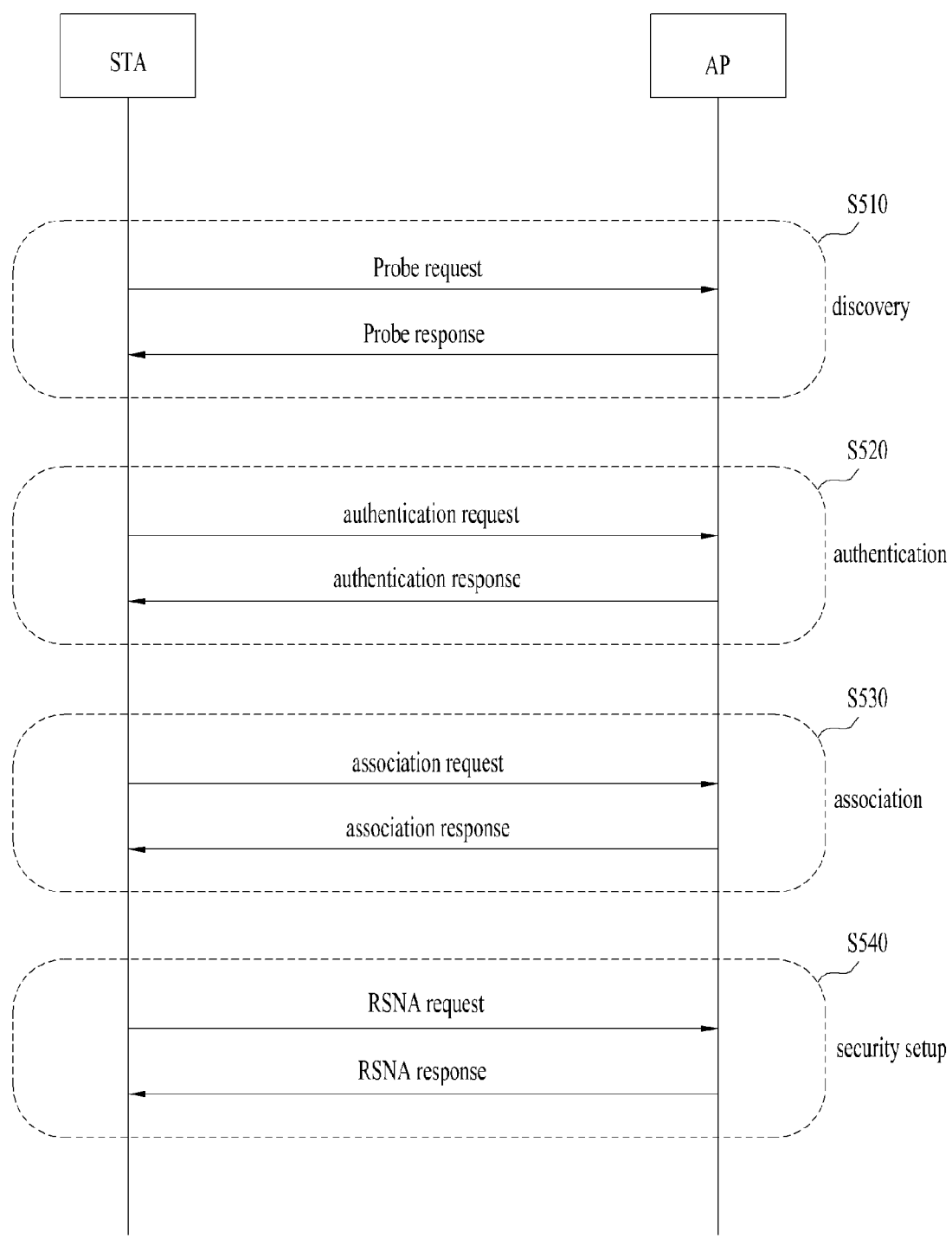
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a HT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11—based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
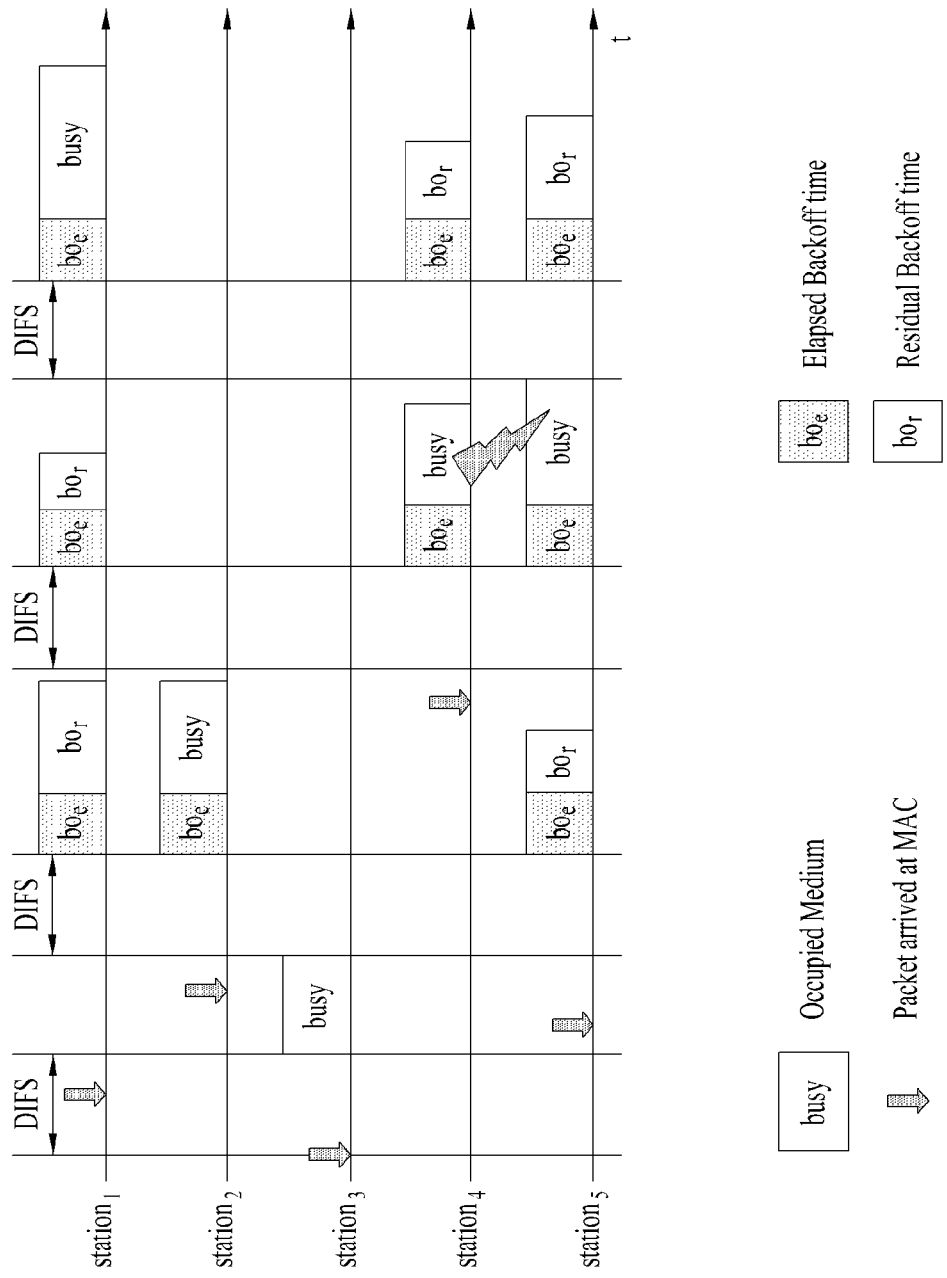
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy-or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
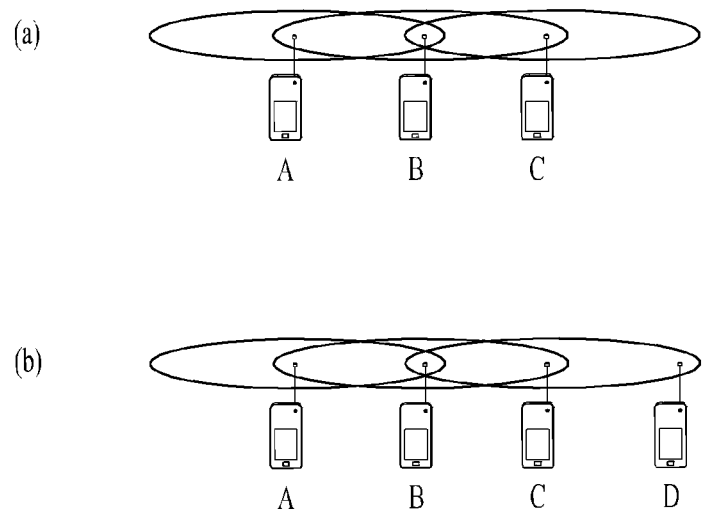
FIG. 7 is a conceptual diagram illustrating a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
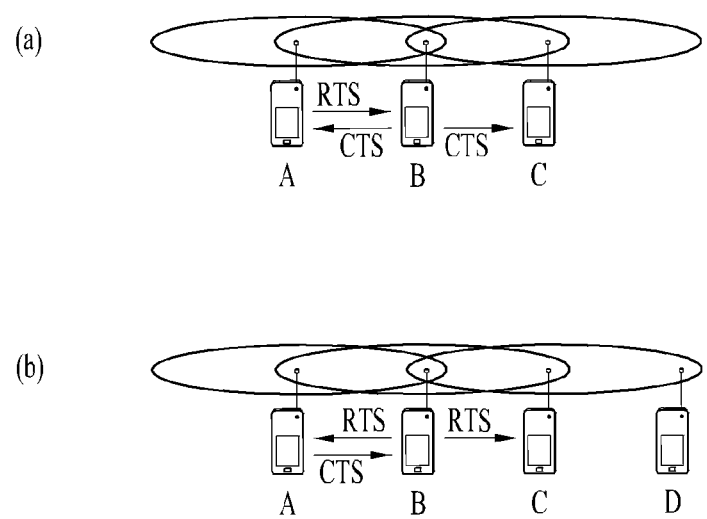
FIG. 8 is a conceptual diagram illustrating RTS (Request To Send) and CTS (Clear To Send)

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

Figure 9:
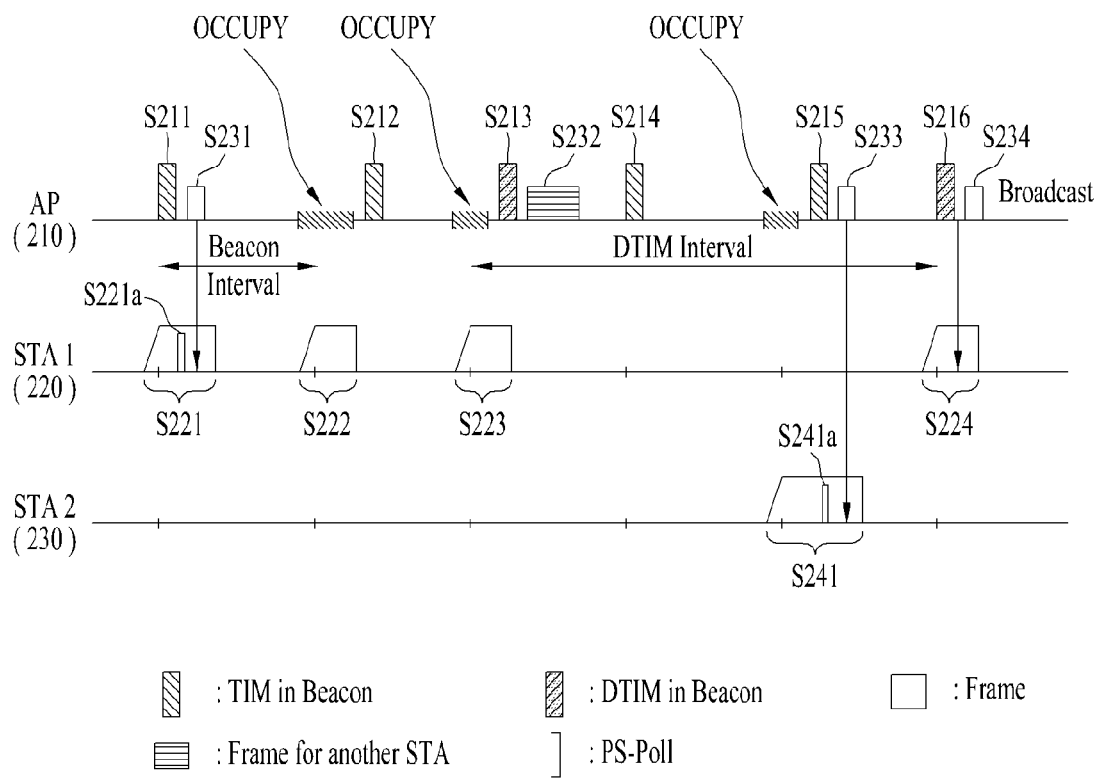
FIG. 9 is a conceptual diagram illustrating a power management operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA 1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
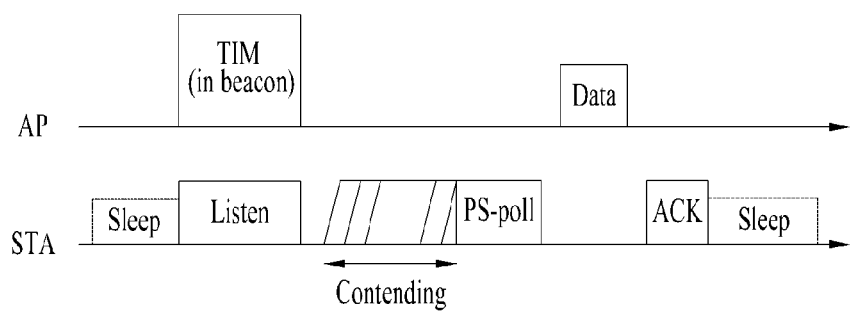
FIGS. 10 to 12 are conceptual diagrams illustrating detailed operations of a station (STA) having received a Traffic Indication Map (TIM)
Figure 11:
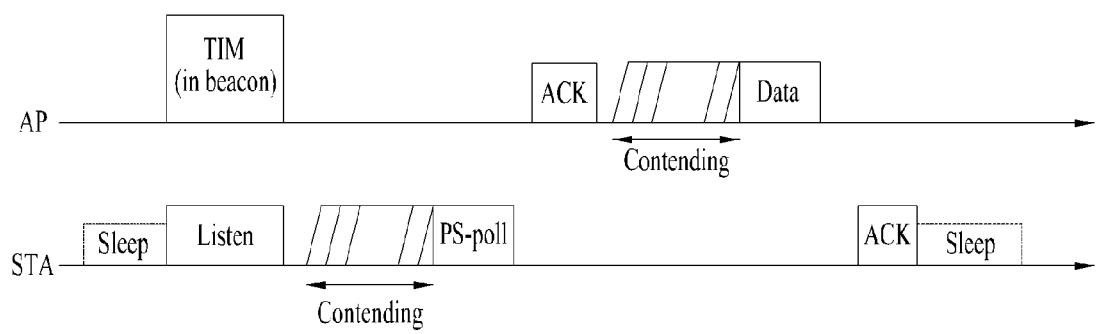
Figure 12:
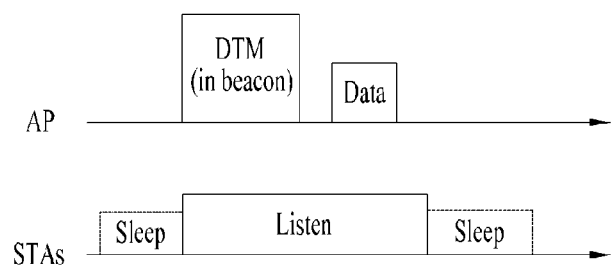

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

Figure 13:
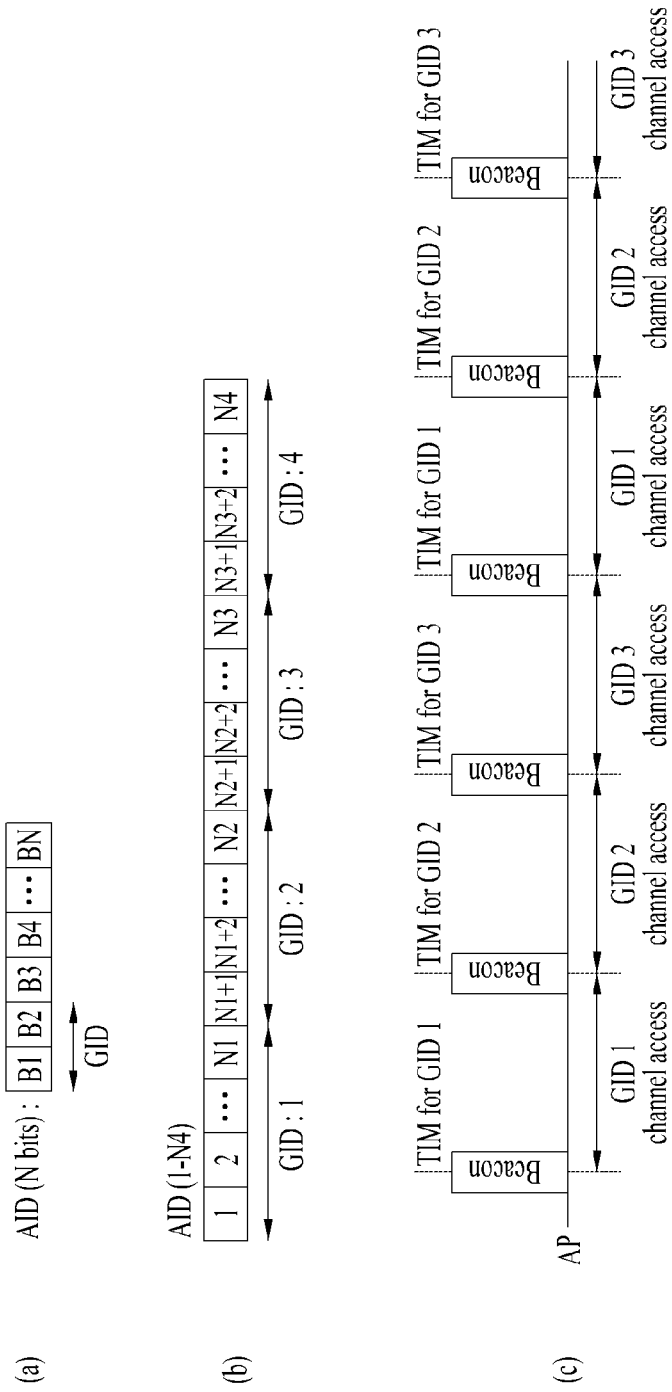
FIG. 13 is a conceptual diagram illustrating a group-based AID.

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

FIG. 13(a) is a conceptual diagram illustrating a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(b) is a conceptual diagram illustrating a group-based AID. In FIG. 13(b), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel access is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13(c). If AIDs are divided into three groups, the channel access mechanism according to the beacon interval is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is periodical or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

Frame Format

Figure 14:
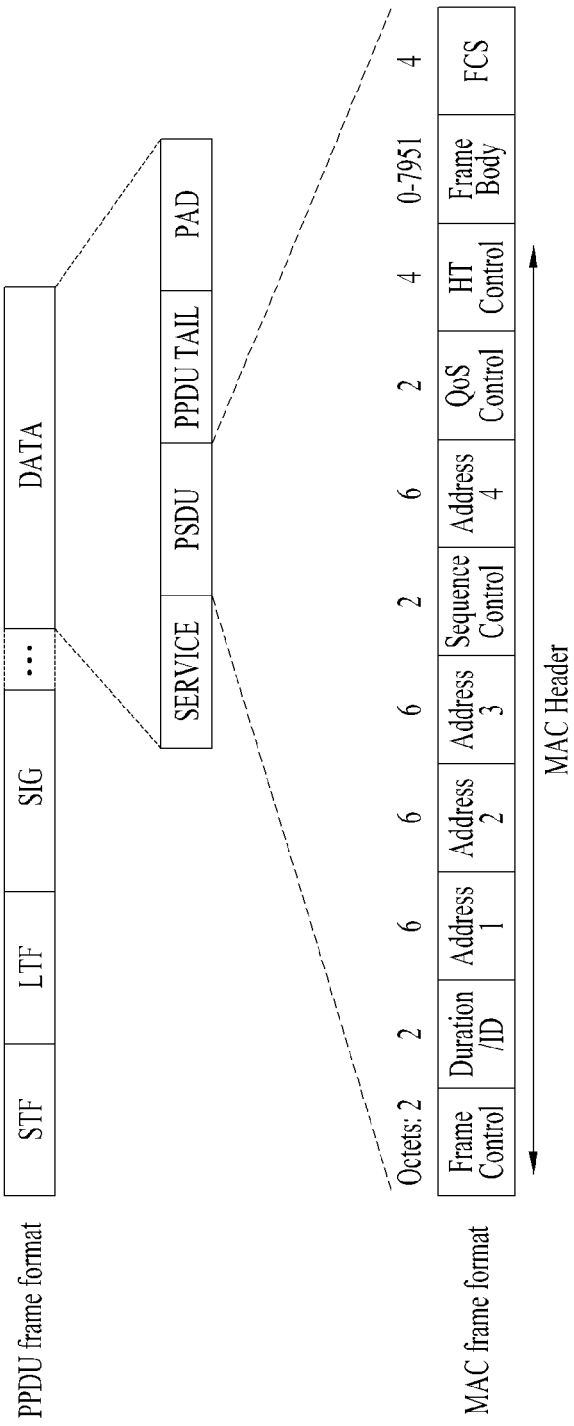
FIG. 14 is a conceptual diagram illustrating a frame structure for use in IEEE 802.11.

FIG. 14 is a diagram for explaining an exemplary frame format used in IEEE 802.11 system.

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU (Protocol Data Unit) defined in the MAC layer, and may include data generated/used in a higher layer. A PPDU TAIL bit may allow the encoder to return to a state of zero (0). The padding bit may be used to adjust the length of a data field according to a predetermined unit.

A MAC header includes a Frame Control field, a Duration/ID field, an Address field, etc. The Frame Control field may include control information needed for frame transmission/reception. The Duration/ID field may be set to a time for transmitting a frame or the like. For details of Sequence Control, QoS Control, and HT Control subfields of the MAC header, the IEEE 802.11-2012 specification may be referred to.

The Frame Control field of the MAC header may include Protocol Version, Type, Subtype, To DS, From DS, More Fragment, Retry, Power Management, More Data, Protected Frame, and Order subfields. For each subfield of the Frame Control field, refer to IEEE 802.11-2012 specification.

A Null-Data Packet (NDP) frame format means a frame format including no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

Sub 1 GHz (S1G) Frame Format

Long-range, low-power communication is required to support applications such as M2M, Internet of Things (IoT), smart grid, etc. For this purpose, a communication protocol using a channel bandwidth of 1/2/4/8/16 MHz in a frequency band of 1 GHz or below (Sub 1 GHz: S1G) (e.g., 902 to 928 MHz) is under discussion.

Three types of formats are defined for an S1G PPDU. They are a short format used in a bandwidth of S1G 2 MHz or above, a long format used in a bandwidth of S1G 2 MHz or above, and a format used in a bandwidth of S1G 1 MHz.

Figure 15:
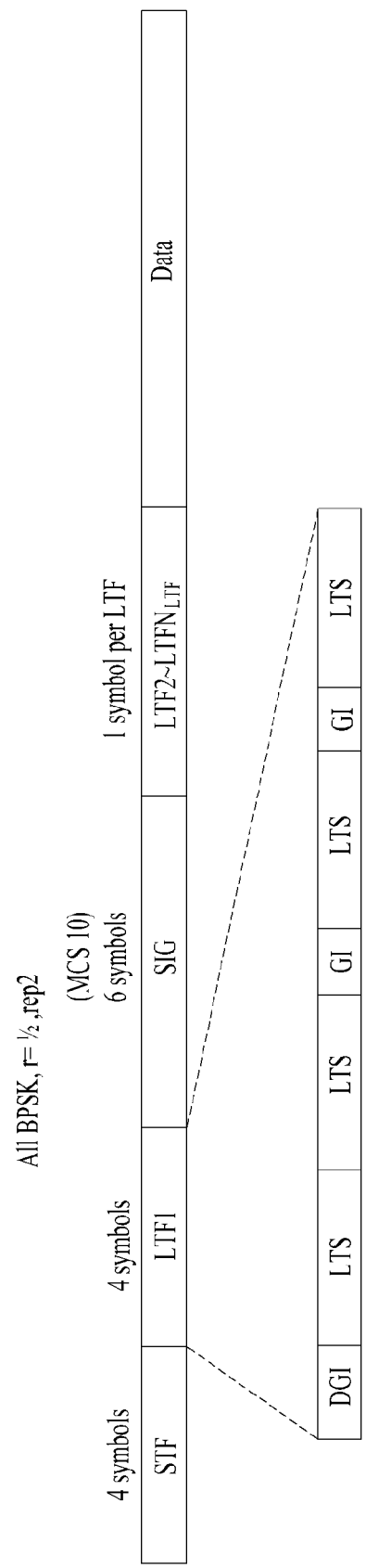
FIG. 15 illustrates an exemplary Sub 1 GHz (S1G) 1 MHz format.

FIG. 15 illustrates an exemplary S1G 1 MHz format.

The S1G 1 MHz format may be used for 1 MHz PPDU Single User (SU) transmission.

Like the Green-field format defined by IEEE 802.11n, the S1G 1 MHz format illustrated in FIG. 15 includes STF, LTF1, SIG, LTF2-LTFN, and Data fields. However, the transmission time of the preamble part of the S1G 1 MHz format is increased by twice or more times through repetition, compared to the Green-field format.

Although the STF field of FIG. 15 has the same periodicity as an STF (a 2-symbol length) of a PPDU in a bandwidth of 2 MHz or above, the STF field is twice repeated in time (rep2) and thus has a 4-symbol length (e.g., 160 μs). Thus 3-dB power boosting may be applied.

The LTF1 field of FIG. 15 is designed to be orthogonal to the LTF1 field (having a 2-symbol length) of the PPDU in the bandwidth of 2 MHz or above in the frequency domain and repeated twice in time, thus having a 4-symbol length. The LTF1 field may include Double Guard Interval (DGI), Long Training Sequence (LTS), LTS, Guard Interval (GI), LTS, GI, and LTS.

The SIG field of FIG. 15 may be iteratively encoded. The SIG field may be configured to be subjected to the lowest Modulation and Coding Scheme (MCS) (i.e. Binary Phase Shift Keying (BPSK)) and repetition coding (rep2), have a rate of ½, and have a 6-symbol length.

LTF2 to $LTFN_{LTF}$ fields of FIG. 15 may be included in case of Multiple Input Multiple Output (MIMO). Each LTF field may be one symbol long.

Figure 16:
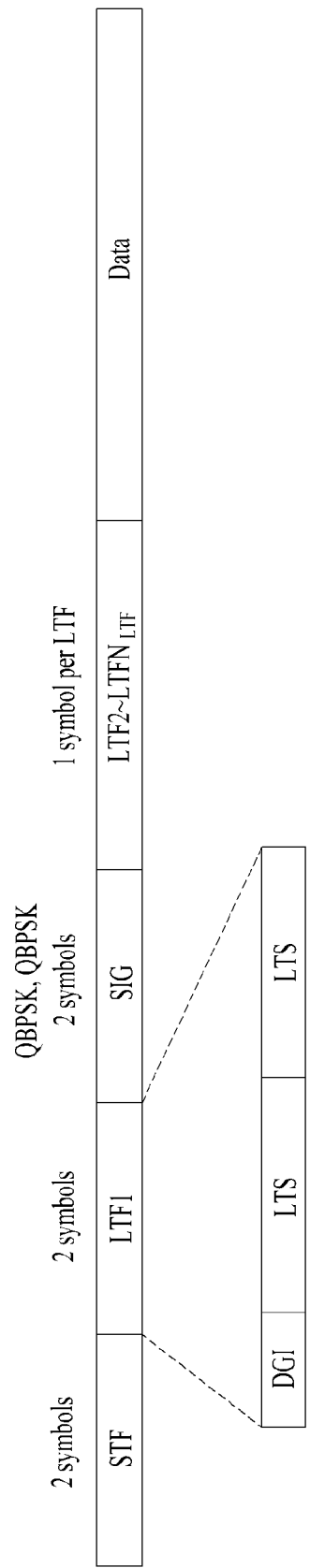
FIG. 16 illustrates an exemplary S1G greater than or equal to 2 MHz short format.

FIG. 16 illustrates an S1G greater than or equal to 2 MHz short format.

The S1G greater than or equal to 2 MHz short format may be used for SU transmission in a PPDU of 2, 4, 8, or 16 MHz.

The STF field of FIG. 16 may have a 2-symbol length.

The LTF1 field of FIG. 16 may have a 2-symbol length, including DGI, LTS, and LTS.

The SIG field of FIG. 16 may be modulated in Quadrature PSK (QPSK), BPSK, etc. as an MCS.

Each of the LTF2 to LTFN$_{LTF}$ fields of FIG. 16 may have a 1-symbol length.

Figure 17:
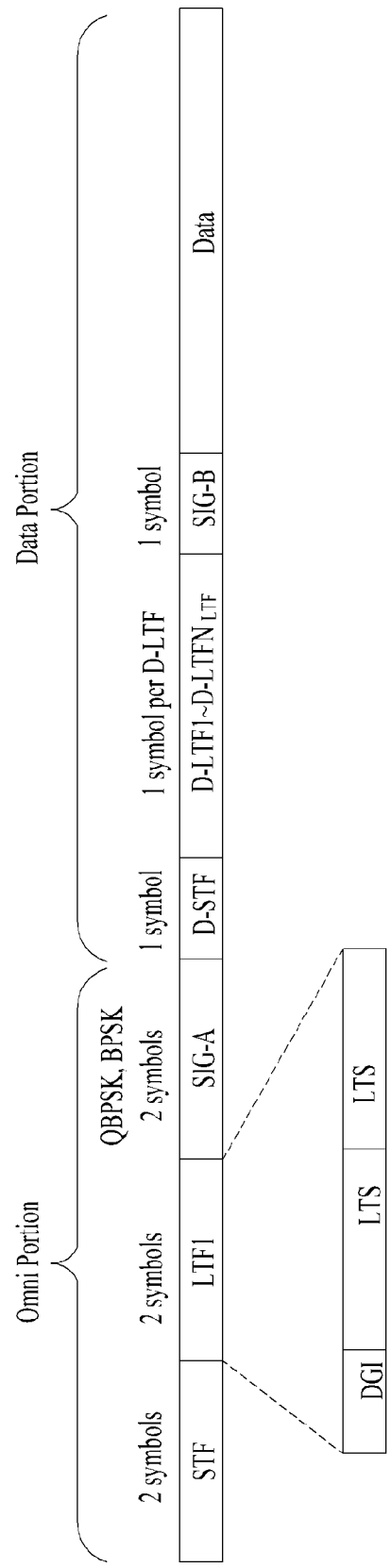
FIG. 17 illustrates an exemplary S1G greater than or equal to 2 MHz long format.

FIG. 17 illustrates an exemplary S1G greater than or equal to 2 MHz long format.

The S1G greater than or equal to 2 MHz long format may be used for MU transmission and SU beamformed transmission in a PPDU of 2, 4, 8, or 16 MHz. The S1G greater than or equal to 2 MHz long format may include an omni part transmitted in all directions and a data part subjected to beamforming.

The STF field of FIG. 17 may have a 2-symbol length.

The LTF1 field of FIG. 17 may have a 2-symbol length, including DGI, LTS, and LTS.

The SIG-A (SIGNAL-A) field of FIG. 17 may use QPSK, BPSK, etc. as an MCS and have a 2-symbol length.

The D-STF (Short Training Field for Data) field of FIG. 17 may have a 1-symbol length.

Each of the D-LTF fields of FIG. 17, that, D-LTF1 to D-LTFN$_{LTF}$ may have a 1-symbol length.

The SIG-B (SIGNAL-B) field of FIG. 17 may have a 1-symbol length.

Channel Access Mechanism in BSS Supporting Channel Bandwidth of 1 MHz and Channel Bandwidth of 2 MHz and Above The present invention proposes a channel access mechanism, particularly a backoff mechanism in a BSS supporting a channel bandwidth of 1 MHz and a channel bandwidth of 2 MHz or above.

STAs of a BSS perform the backoff mechanism using a primary channel. That is, the STAs may determine whether a corresponding channel (or medium) is idle by performing CCA or the like on a primary channel. The primary channel is defined as a common channel for all members of a BSS, that is, STAs of the BSS and may be used for transmitting a basic signal such as a beacon. Also, the primary channel may be represented as a basic channel used for transmitting a data unit (e.g., a PPDU). If a channel bandwidth that an STA uses for data transmission is larger than the size of a primary channel, a channel other than the primary channel within the corresponding channel is called a secondary channel.

While a legacy WLAN system has only one channel bandwidth for a primary channel, an advanced WLAN system may have two different channel bandwidths for a primary channel according to STA capabilities. The present invention proposes a backoff mechanism in such a multi-channel environment.

For example, a sensor-type STA may support (only) 1 MHz or 2 MHz to reduce implementation complexity. However, a higher throughput is required for an IoT-type or M2M-type STA. To satisfy the higher throughput, the STA may support (only) 2, 4, 8, or 16 MHz.

In the present invention, STAs supporting a channel bandwidth of 1 MHz or 2 MHz are referred to as Low Rate (LR) STAs and STAs supporting a channel bandwidth of 2, 4, 8, or 16 MHz are referred to as High Rate (HR) STAs. It is assumed that a primary channel of an LR STA has a channel bandwidth of 1 MHz and a primary channel of an HR STA has a channel bandwidth of 2 MHz.

A detailed description will be given of a backoff mechanism of an STA in a multi-channel environment in which primary channels have two channel bandwidths depending on capabilities of STAs according to the present invention.

An AP may indicate a primary channel for an LR STA by a beacon frame. This is referred to as a first primary channel in the present invention. The AP may also indicate a primary channel for an HR STA. This is referred to as a second primary channel in the present invention. For example, the first primary channel may correspond to a primary channel having a bandwidth of 1 MHz and the second primary channel may correspond to a primary channel having a bandwidth of 2 MHz.

Figure 18:
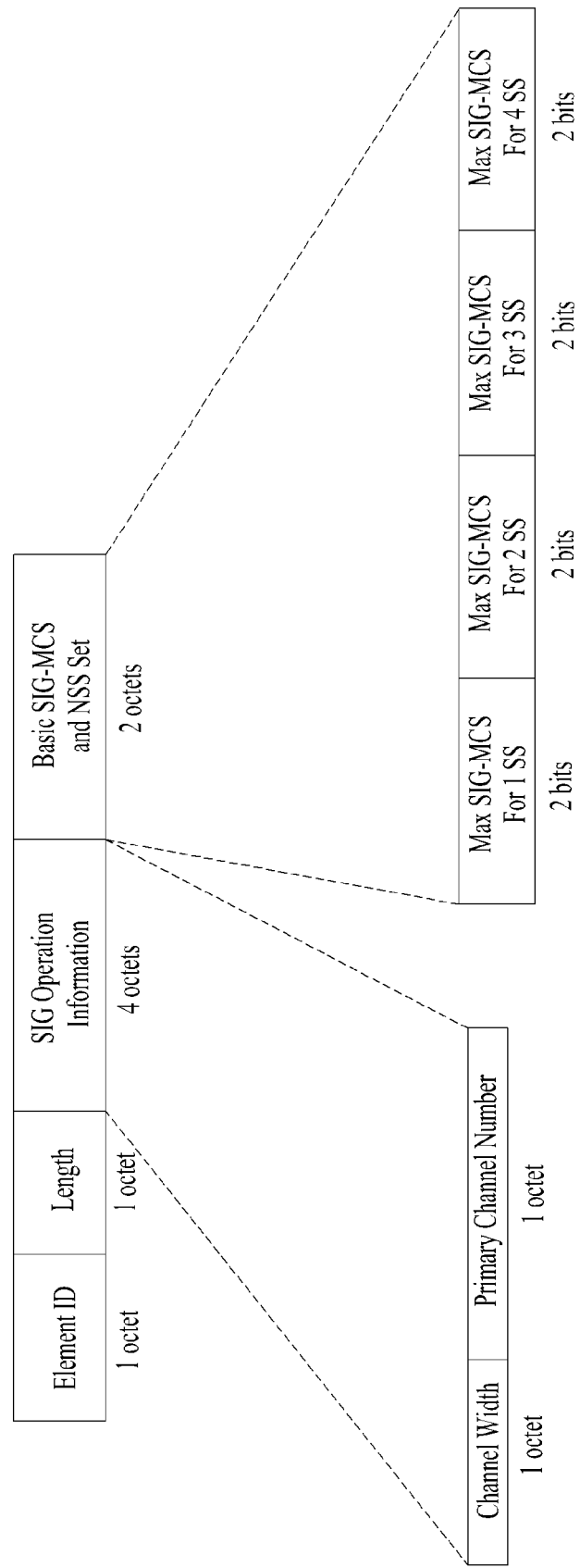
FIG. 18 illustrates an exemplary format of an SIG operation element.

FIG. 18 illustrates an exemplary format of an SIG operation element.

The SIG operation element of FIG. 18 may be transmitted to STAs belonging to a BSS by a beacon frame or a probe response frame. Accordingly, an SIG BSS channel set may be established.

The SIG operation element format may include an element ID field, a length field, a SIG Operation Information field, and a basic SIG-MCS and Number of Spatial Stream (NSS) set field.

In the SIG operation element, the element ID field may be set to a value indicating that the information element is an SIG operation element.

The length field may be set to a value indicating the length of the following fields.

The SIG Operation Information field may include a Channel Width field and a Primary Channel Number field.

For example, bit 0 to bit 5 (B0 to B5) of the Channel Width field may be set to a value indicating one of 1, 2, 4, 8, and 16 MHz. Bits 6 and 7 (B6 and B7) of the Channel Width field may be set to a value indicating the location of a first primary channel. For example, 00 may indicate no first primary channel, 01 may indicate a lower side of a second primary channel, 10 may indicate an upper side of the second primary channel, and 11 may be reserved.

Or bit 0 to bit 5 (B0 to B5) of the Channel Width field may be configured as follows. If the S1G BSS allows 1 MHz PPDU transmission, B0 may be set to 1. If the S1G BSS allows 2 MHz PPDU transmission, B1 may be set to 1. If the S1G BSS allows 4 MHz PPDU transmission, B2 may be set to 1. If the S1G BSS allows 8 MHz PPDU transmission, B3 may be set to 1. If the S1G BSS allows 16 MHz PPDU transmission, B4 may be set to 1. B5 may indicate the location of a 1 MHz primary channel (for example, if B5 is set to 0, this indicates the lower side of a 2 MHz primary channel, and if B5 is set to 1, this indicates the upper side of the 2 MHz primary channel).

The first primary channel corresponds to a part of the second primary channel. That is, the first primary channel exists on the second primary channel. Also, the first primary channel has a smaller channel bandwidth than the second primary channel. For example, the second primary channel (or the 2 MHz primary channel) may include the first primary channel (or the 1 MHz primary channel), and the first primary channel may be located in one of the upper 1 MHz side and lower 1 MHz side of the 2 MHz bandwidth of the second primary channel.

The Primary Channel Number field may be set to a value indicating the channel number of the second primary channel.

In this manner, the locations of the second primary channel and the first primary channel (when existing) may be specified by the Channel Bandwidth field and the Primary Channel Number field included in the SIG Operation Information field.

The Basic SIG-MCS and NSS Set field of the SIG operation element may include a Max SIG-MCS for 1SS field, a Max SIG-MCS for 2SS field, a Max SIG-MCS for 3SS field, and a Max SIG-MCS for 4SS field. A Max SIG-MCS field for N SSs (N=1, 2, 3, or 4) may be set to a value indicating the index of a highest MCS supported for N SSs.

With reference to FIG. 18, an AP may support the following three types of BSSs using the above-described SIG operation element.

First, the AP may support a BSS including only LR STAs. In this case, bits B6 and B7 of the Channel Width field in the SIG operation element may be limited to one of 01 and 10. That is, only when the location of a first primary channel to be used by an LR STA is set to one of the upper and lower sides of a second primary channel, the location of the first primary channel may be specified.

Second, the AP may support a BSS including only HR STAs. In this case, bits B6 and B7 of the Channel Width field in the SIG operation element illustrated in FIG. 18 may be limited to 00. This may imply that a first primary channel is not configured (or does not exist) for an LR STA and 1 MHz PPDU transmission is not supported by the BSS.

Third, the AP may support a BSS in which an LR STA is co-existent with an HR STA. In this case, bits B6 and B7 of the Channel Width field of the SIG operation element illustrated in FIG. 18 may be set to 00, 01, or 11.

As described above, if the bandwidth of a primary channel in a BSS is set to 1 MHz and/or 2 MHz, a backoff operation of an STA belonging to the BSS will be described below.

Basically, the STA performs a backoff operation on a primary channel. Then when a backoff count (or a backoff timer value) reaches 0, the STA may determine a transmission bandwidth by checking the idle/busy state of a secondary channel at a corresponding time.

For example, if a first primary channel is not established as in a BSS including only HR STAs, the STA may invoke a backoff operation on a second primary channel (or a 2 MHz primary channel). If a channel is idle on the second primary channel during a backoff slot, the STA decreases the backoff timer value by 1 each time. If the backoff timer value reaches 0, the STA may determine whether secondary channels are idle. That is, after the backoff timer value reaches 0, the STA may perform CCA on a 2 MHz secondary channel, a 4 MHz secondary channel, or an 8 MHz secondary channel. The STA may transmit a PPDU (e.g., a 2, 4, 8, or 16 MHz PPDU) by including an idle secondary channel(s) according to a CCA result of the secondary channel(s).

For example, if a first primary channel is established as in a BSS including only LR STAs, the STA may invoke a backoff operation on the first primary channel (or a 1 MHz primary channel). If a channel is idle on the first primary channel during a backoff slot, the STA decreases the backoff timer value by 1 each time. If the backoff timer value reaches 0, the STA may determine whether secondary channels are idle. That is, after the backoff timer value reaches 0, the STA may perform CCA on a 1 MHz secondary channel, a 2 MHz secondary channel, a 4 MHz secondary channel, or an 8 MHz secondary channel. The STA may transmit a PPDU (e.g., a 1, 2, 4, 8, or 16 MHz PPDU) by including an idle secondary channel(s) according to a CCA result of the secondary channel(s).

Now a detailed description will be given of secondary channels.

An AP may indicate a secondary channel to be used for an LR STA by a beacon frame or the like. In the present invention, this secondary channel will be referred to as a first secondary channel. Also, the AP may indicate a secondary channel to be used for an HR STA. In the present invention, this secondary channel will be referred to as a second secondary channel.

The first secondary channel corresponds to a part of the second primary channel. A plurality of second secondary channels may exist and may have different channel bandwidths.

Figure 19:
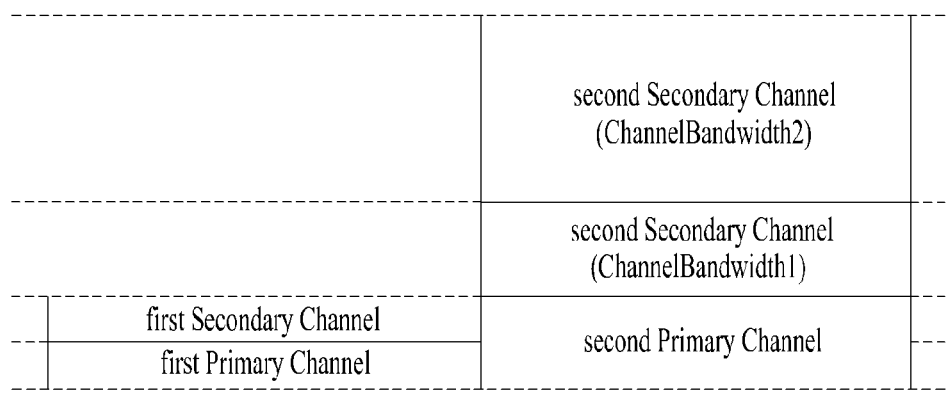
FIG. 19 illustrates a relationship between primary channels and secondary channels.

FIG. 19 illustrates a relationship between primary channels and secondary channels.

Each of a first primary channel and a first secondary channel corresponds to a part of a second primary channel. One or more second secondary channels may be established. If a plurality of second secondary channels are established, the second secondary channels may have different channel bandwidths (e.g., ChannelBandwidth1 and ChannelBandwidth2).

If the first primary channel and the first secondary channel are bonded to the second primary channel, the AP may indicate only the numbers of the first primary channel, the second primary channel, and the second secondary channel, without the number of the first secondary channel.

An exemplary backoff operation in the case where primary channels and secondary channels are established as illustrated in FIG. 19 will be described below.

An LR STA may perform channel access on the first primary channel. For example, the LR STA may determine the idle/busy state of a channel on the first primary channel and perform a backoff mechanism according to the determination. If the first primary channel is idle during a backoff slot, the STA decreases a backoff timer value by 1 and otherwise, the STA freezes the backoff timer (i.e., the STA maintains the previous backoff count without decreasing it).

An HR STA may perform channel access on the second primary channel. For example, the HR STA may determine the idle/busy state of a channel on the second primary channel and perform a backoff mechanism according to the determination. If the second primary channel is idle during a backoff slot, the STA decreases a backoff timer value by 1 and otherwise, the STA freezes a backoff timer (i.e., the STA maintains the previous backoff count without decreasing it).

If the STA performs channel sensing on the second primary channel and senses another STA's use of the first primary channel or the first secondary channel belonging to the second primary channel, the STA should determine that the second primary channel itself is busy.

Figure 20:
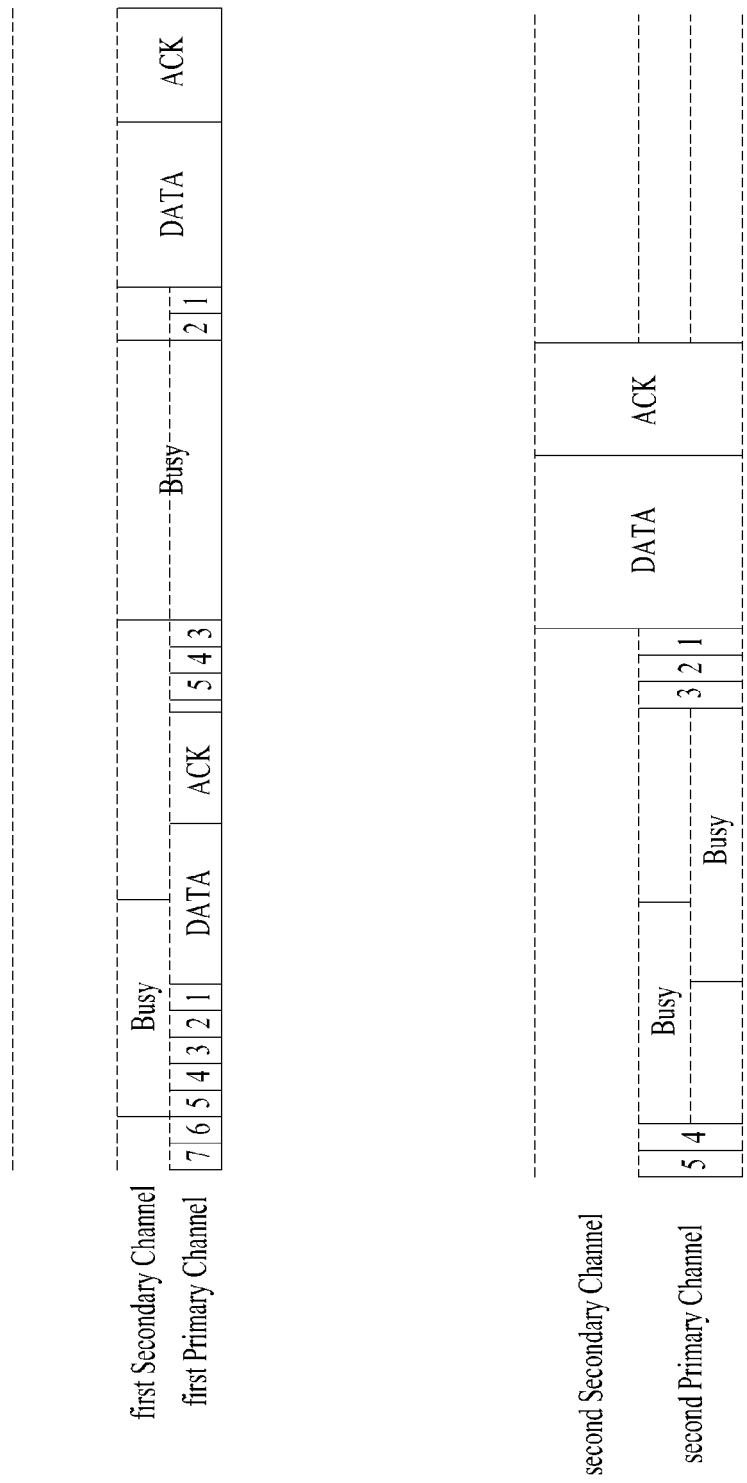
FIG. 20 illustrates exemplary backoff operations of STAs.

FIG. 20 illustrates exemplary backoff operations of STAs.

FIG. 20(a) illustrates a backoff operation of an LR STA and FIG. 20(b) illustrates a backoff operation of an HR STA. In the examples of FIGS. 20(a) and 20(b), it is assumed that the LR STA and the HR STA start backoff at the same time point and select 7 and 5 respectively as a backoff timer value.

Referring to FIG. 20(a), the LR STA performs channel sensing only on a first primary channel and decreases a backoff timer value from 7 to 6, 5, 4, 3, 2, and 1 sequentially by performing a backoff operation according to the result of the channel sensing. Although the first secondary channel is busy due to communication of another BSS, the LR STA performs channel sensing on the first primary channel and thus the backoff timer value reaches 0 irrespective of use of the first secondary channel. Therefore, the STA is allowed to begin a Transmission Opportunity (TXOP) and may transmit a data frame. However, since the first secondary channel is busy at the moment when the backoff timer value reaches 0, the LR STA may not use the first secondary channel for data frame transmission. Instead, the LR STA may transmit a data frame (i.e. a PPDU frame using a channel bandwidth of 1 MHz) only on the first primary channel. Then the LR STA may receive an ACK frame from the AP.

The LR STA may perform the backoff operation again to transmit additional data. If the LR STA has selected 5 as a random backoff timer value, the LR STA decreases the backoff timer from 5 to 4 and 3 sequentially while a channel is idle on the first primary channel. At this moment, the first primary channel gets busy due to data frame transmission from an HR STA. Accordingly, the LR STA freezes countdown of the backoff timer. After the HR STA completes data frame transmission and ACK frame reception, the LR STA resumes the backoff operation while the first primary channel is idle and decreases the backoff timer value to 2, 1, and then 0. If the backoff timer value is 0, the STA may transmit a data frame, determining that the STA is allowed to begin a TXOP. Since the first secondary channel is idle at the moment when the backoff timer value reaches 0, the LR STA may transmit a data frame (i.e., a PPDU frame using a channel bandwidth of 2 MHz) using both the first primary channel and the second secondary channel.

Referring to FIG. 20(b), the HR STA performs channel sensing on the second primary channel and decreases a backoff timer value from 5 to 4 by performing a backoff operation according to the result of the channel sensing. If a part of the second primary channel (i.e. a part corresponding to the first secondary channel) is used by another LR STA and thus the channel is busy at this time, the HR STA freezes the count-down of the backoff timer. If although the part of the second primary channel (i.e., the part corresponding to the first secondary channel) gets idle, another part of the second primary channel (a part corresponding to the first primary channel) is busy, the HR STA determines that the second primary channel is busy. Therefore, if no part of the second primary channel is busy (i.e. the whole second primary channel is idle), the HR STA resumes the count-down of the backoff timer and thus decreases the backoff timer value to 3, 2, and 1, sequentially. If the backoff timer value reaches 0, the HR STA may transmit a data frame, determining that the HR STA is allowed to begin a TXOP. Since the second secondary channel is idle, the HR STA may transmit a data frame (i.e. a 4 MHz PPDU frame) using both the second primary channel and the second secondary channel.

It is noted from the examples of FIG. 20 that the LR STA has a higher probability of gaining a TXOP than the HR STA. That is, although the LR STA and the HR STA perform a backoff operation using the first primary channel and the second primary channel, respectively, since the probability of the whole second primary channel being idle is lower than the probability of the first primary channel being idle, the HR STA has fewer opportunities for performing a backoff count-down than the LR STA. As a consequence, the HR STA has a lower probability of gaining a TXOP than the LR STA. That is, fairness in channel access between the LR STA and the HR STA is impaired.

To solve this problem, it may be considered that both the LR STA and the HR STA perform a backoff operation only on the first primary channel. For example, it may be regulated that both the LR STA and the HR STA support only the reception capability of the first primary channel and perform a backoff mechanism only on the first primary channel.

In a BSS supporting the channel bandwidths of 1, 2, 4, 8, and 16 MHz, for example, both an LR STA and an HR STA commonly support the reception capability of 1 MHz transmission and commonly perform a backoff mechanism on a 1 MHz channel. If as an STA performs channel sensing only on the 1 MHz channel and accordingly performs a backoff operation, the backoff timer reaches 0, the STA (irrespective of an LR STA or an HR STA) may transmit data, determining that it is allowed to begin a TXOP. Irrespective of whether the secondary channels are idle/busy during backoff countdown, transmission of a 1, 2, 4, 8, or 16 MHz PPDU frame may be determined according to the idle/busy state(s) of the secondary channel(s), after the backoff timer value of the STA reaches 0. Also, the bandwidth of a data frame to be transmitted after the backoff timer value reaches 0 may be limited according to the transmission capability of the STA.

That is, both the LR STA and the HR STA perform the backoff mechanism using the first primary channel, and the transmission bandwidth of data transmission is determined according to the transmission capability of an STA for which the backoff timer value reaches 0 and the idle/busy states of the first secondary channel and the second secondary channels.

However, even though an HR STA for which data transmission only on the first primary channel is not supported (i.e. the 1 MHz primary channel is not supported) (i.e. the HR STA should use at least the secondary primary channel (i.e. the 2 MHz primary channel for data transmission) is allowed to begin a TXOP (or even though a backoff timer value reaches 0), the HR STA may not transmit data if all secondary channels are busy and only the first primary channel is idle.

In this case, the HR STA may perform the backoff operation again. Unlike a new backoff operation triggered by collision, the backoff operation may be performed again, keeping a contention window at a previous value without doubling the contention window and using an unchanged retransmission count.

However, even though this scheme may offer channel access fairness between an LR STA and an HR STA, the HR STA may not perform channel access in spite of successful backoff countdown, which is inefficient.

Meanwhile, the problem of unfairness in channel access between an LR STA and an HR STA as illustrated in FIG. 20 may be overcome by allowing both the LR STA and the HR STA to support only the reception capability of the second primary channel and limiting the backoff mechanism of the LR STA and the HR STA to the second primary channel.

In a BSS supporting the channel bandwidths of 1, 2, 4, 8, and 16 MHz, for example, both an LR STA and an HR STA commonly support the reception capability of 2 MHz transmission and commonly perform a backoff mechanism on a 2 MHz channel. If as an STA performs channel sensing only on the 2 MHz channel and accordingly performs a backoff operation, the STA is allowed to begin a TXOP (or the backoff timer values reaches 0), the STA (irrespective of an LR STA or an HR STA) may transmit data. If the backoff timer value reaches 0, the STA may transmit a 1 or 2 MHz PPDU frame according to the idle/busy states of the first primary channel, the first secondary channel, and the second primary channel. Irrespective of whether the second secondary channel is idle/busy during the backoff countdown, transmission of a 4, 8, or 16 MHz PPDU frame may be determined according to the idle/busy state of the second secondary channel after the backoff timer value reaches 0. Also, the bandwidth of a data frame to be transmitted after the backoff timer value reaches 0 may be limited according to the transmission capability of the STA.

That is, both the LR STA and the HR STA perform the backoff mechanism using the second primary channel and the transmission bandwidth of data transmission is determined according to the transmission capability of an STA which is allowed to begin a TXOP (or for which the backoff timer value reaches 0) and the idle/busy states of the first primary channel, the first secondary channel, and the second secondary channels.

This scheme may offer channel access fairness between the LR STA and the HR STA. However, if the first primary channel is idle and the first secondary channel is busy, even the LR STA intending to transmit a 1 MHZ PPDU frame does not continue the backoff countdown because the second primary channel is busy. Consequently, since the idle first primary channel is not utilized, the efficiency of bandwidth use is decreased from the viewpoint of an overall system.

To solve the afore-described problems, the present invention proposes that if an LR STA performs a backoff operation using a first primary channel and is allowed to begin a TXOP as a result of the backoff operation (or after a backoff timer value reaches 0), even though a second secondary channel is idle, the LR STA is not allowed to use the second secondary channel but to transmit data only on the first primary channel.

In other words, in the case where the first primacy channel and the first secondary channel are bonded to the second primary channel, if a backoff operation is performed on the first primary channel and as a result, a TXOP is allowed to begin (or after a backoff timer value reaches 0), data transmission is prohibited on the second primary channel, whereas data transmission is allowed on the first primary channel. This may be a minimum action to take in order to overcome the fairness problem between the LR STA and the HR STA, compared to the case where the HR STA performs a backoff operation on the second primary channel to transmit data on the second primary channel.

According to this scheme, if the LR STA wants to transmit data using both the first primary channel and the first secondary channel (i.e. on the second primary channel), it may be understood that the LR STA should perform a backoff operation on the second primary channel from the beginning, not only on the first primary channel.

Figure 21:
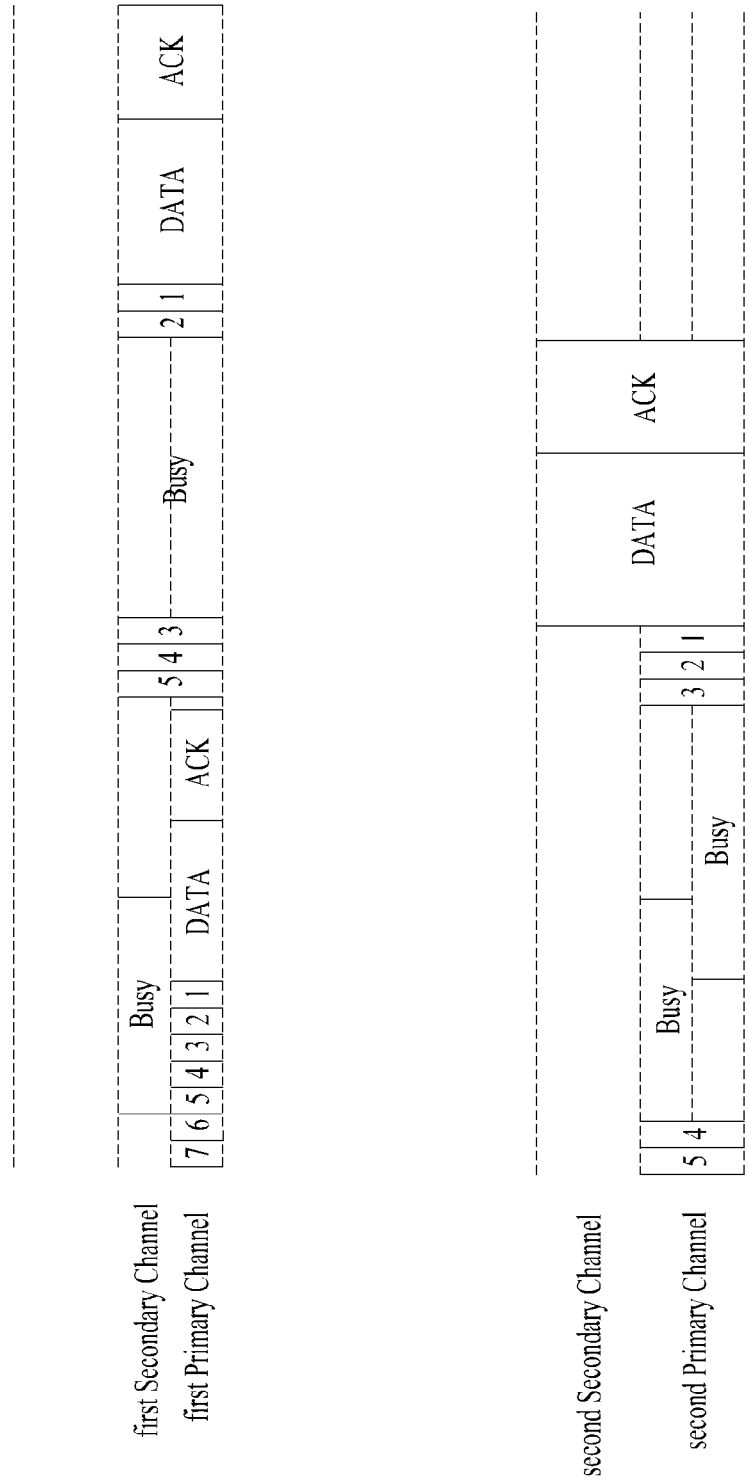
FIG. 21 illustrates an exemplary backoff operation of an STA according to the present invention.

FIG. 21 illustrates an exemplary backoff operation of an STA according to the present invention.

As illustrated in the example of FIG. 21, if an LR STA intends to transmit data (or a PPDU having a channel bandwidth of 2 MHz or above) using both the first primary channel and the first secondary channel, the LR STA may decrease a backoff timer value by 1 each time, only when both the first primary channel and the second secondary channel are idle.

If an STA has the capabilities of both an LR STA and an HR STA (e.g., an STA supports transmission in any of the channel bandwidths of 1, 2, 4, 8, and 16 MHz), even though the STA is allowed to begin a TXOP by performing a backoff operation on a 1 MHz channel (or even though the backoff timer value reaches 0), the STA may not transmit data on a 2, 4, 8, or 16 MHz channel. That is, after the STA performs the backoff mechanism on the first primary channel, the STA is prohibited from transmitting data on the second primary channel and the second secondary channel.

In summary, if the STA performs a backoff operation on the first primary channel, an operation for transmitting data (or a PPDU using a channel bandwidth of 1 MHz) only on the first primary channel is defined. If the STA has performed a backoff operation on the first primary channel and the first secondary channel (i.e. the second secondary channel), when a TXOP is allowed to begin (or after the backoff timer value reaches 0), the STA may transmit a data frame only on the second primary channel (or a PPDU frame using a channel bandwidth of 2 MHz) according to the channel state of the second secondary channel, or transmit a data frame (or a PPDU frame using a channel bandwidth of 4 MHz) using both the second primary channel and the second secondary channel.

While the STA is shown in the examples of FIGS. 20 and 21 as transmitting a data unit (or PPDU) having an up to 4 MHz bandwidth, the present invention is not limited thereto. As illustrated in FIG. 19, the principle of the present invention may be applied to transmission of a PPDU having a bandwidth of up to 8 MHz or above. For example, if an STA is allowed to begin a TXOP by performing a first backoff procedure on the first primary channel (or the 1 MHz primary channel), only 1-MHz PPDU transmission is allowed (i.e., transmission of a PPDU having 2 MHz or above is not performed). If the STA is allowed to begin a TXOP by performing a second backoff procedure on the second primary channel (or the 2 MHz primary channel), the STA may transmit a 2 MHz PPDU (when only the 2-MHz second primary channel is idle), a 4 MHz PPDU (when both the 2-MHz second primary channel and the 2-MHz second secondary channel are idle), a 8 MHz PPDU (when the 2-MHz second primary channel, the 2-MHz second secondary channel, and the 4-MHz second secondary channel are idle), or a 16 MHz PPDU (when the 2-MHz second primary channel, the 2-MHz second secondary channel, the 4-MHz second secondary channel, and the 8-MHz second secondary channel are idle), according to the idle state of the secondary channels (having 2, 4, and 8 MHz) during a Point Coordination Function (PCF) Interframe Space (PIFS) shortly before the TXOP.

CCA Thresholds

When an STA performs the backoff operation on the first primary channel and the second primary channel, a CCA operation for determining whether a channel is idle or busy is determined mainly according to a CCA threshold (or a CCA power threshold) in the present invention. For example, if a received signal strength detected from a channel is equal to or larger than a CCA threshold, the channel may be determined to be busy. As a higher CCA threshold is set, other signals are less protected (that is, the probability of colliding with signals transmitted by other devices is higher), whereas as a lower CCA threshold is set, other signals are more protected (that is, the probability of colliding with signals transmitted by other devices is lower).

Meanwhile, an LR STA and an HR STA have different usage scenarios. The LR STA wants to service a long distance with low power, whereas the HR STA seeks to achieve higher throughput than power consumption. Since the LR STA and the HR STA serve conflicting purposes, a CCA threshold which is a criterion for determining whether a channel (or a medium) is idle or busy by the LR STA and the HR STA needs to be different according to a use environment.

In this context, the present invention proposes that two or more CCA thresholds should be defined. For example, an LR CCA threshold and an HR CCA threshold may be separately defined and the HR CCA threshold may be set to be higher than the LR CCA threshold. For example, if a signal smaller than the HR CCA threshold and larger than the LR CCA threshold is detected, an STA using the HR CCA determines that the channel is not busy (i.e. idle) despite detection of the signal, whereas an STA using the LR CCA threshold determines that the channel is busy when this signal is detected. Compared to the STA using the LR CCA threshold, the STA using the HR CCA threshold may less protect signals from other devices. Accordingly, the STA using the HR CCA threshold should narrow a service range compared to the STA using the LR CCA threshold.

It is assumed that an STA basically (as a default value) uses an HR CCA threshold in the present invention. If the STA is not serviced properly due to an interference signal, the STA may transmit a management frame requesting HR CCA Prohibit to an AP. Upon receipt of the management frame requesting HR CCA Prohibit, the AP may broadcast a management frame commanding HR CCA Prohibit to all STAs of an S1G BSS. Upon receipt of the management frame commanding HR CCA Prohibit, an STA(s) switches from the HR CCA threshold to an LR CCA threshold.

If BSAs of different BSSs are partially or wholly overlapped and operate on the same channel, these BSSs are referred to as OBSSs. If an STA(s) receives a management frame commanding HR CCA Prohibit from an AP of an adjacent BSS in an environment having an OBSS, the STA(s) changes its CCA threshold to the LR CCA threshold. Although the STA may use the changed LR CCA threshold, the LR CCA threshold is not continuously applied. If the AP of the adjacent BSS that has transmitted the HR CCA Prohibit management frame does not service any longer, there is no need for using the LR CCA threshold.

Accordingly, the STA(s) which has received the management frame commanding HR CCA Prohibit may change from the HR CCA threshold to the LR CA threshold and apply the LR CCA threshold for a predetermined time (e.g., an HR CCA Prohibit timeout). After the HR CCA Prohibit timeout, the STA returns to the HR CCA threshold. Accordingly, if the LR CCA threshold is to be continuously used, a management frame commanding HR CCA Prohibit should be transmitted continuously at a smaller interval than the HR CCA Prohibit timeout.

The management frame requesting HR CCA Prohibit may include information indicating a time period during which HR CCA Prohibit is applied (e.g., an HR CCA Prohibit start time, an HR CCA Prohibit timeout, etc.). That is, if an STA is not serviced properly due to an interference signal, information about an HR CCA Prohibit start time and an HR CCA Prohibit timeout that define a time period may be included in a management frame requesting HR CCA Prohibit in order to request HR CCA Prohibit during a time period of the interference signal.

Even when the AP transmits the management frame commanding HR CCA Prohibit, information indicating a time period such as an HR CCA Prohibit start time and an HR CCA Prohibit timeout may be included in the management frame commanding HR CCA Prohibit, so that the AP may command HR CCA Prohibit for a specific time period.

Upon receipt of the HR CCA Prohibit management frame including the HR CCA Prohibit start time and the HR CCA Prohibit timeout, an STA(s) may change from the HR CCA threshold to the LR CCA threshold only for the time period defined by the HR CCA Prohibit start time and the HR CCA Prohibit timeout. The STA may continuously use the HR CCA threshold during an unspecified time period.

If an AP or STA that has received a management frame related to HR CCA Prohibit moves to another channel, HR CCA Prohibit is not applied to the channel. This means that signaling for HR CCA Prohibit is performed per channel. If the AP that has received the HR CCA Prohibit management frame performs channel switching, when the STA that has received the HR CCA Prohibit management frame scans on another channel, channel access can be performed using the HR CCA threshold, while the previous signaling for HR CCA Prohibit is ignored.

Figure 22:
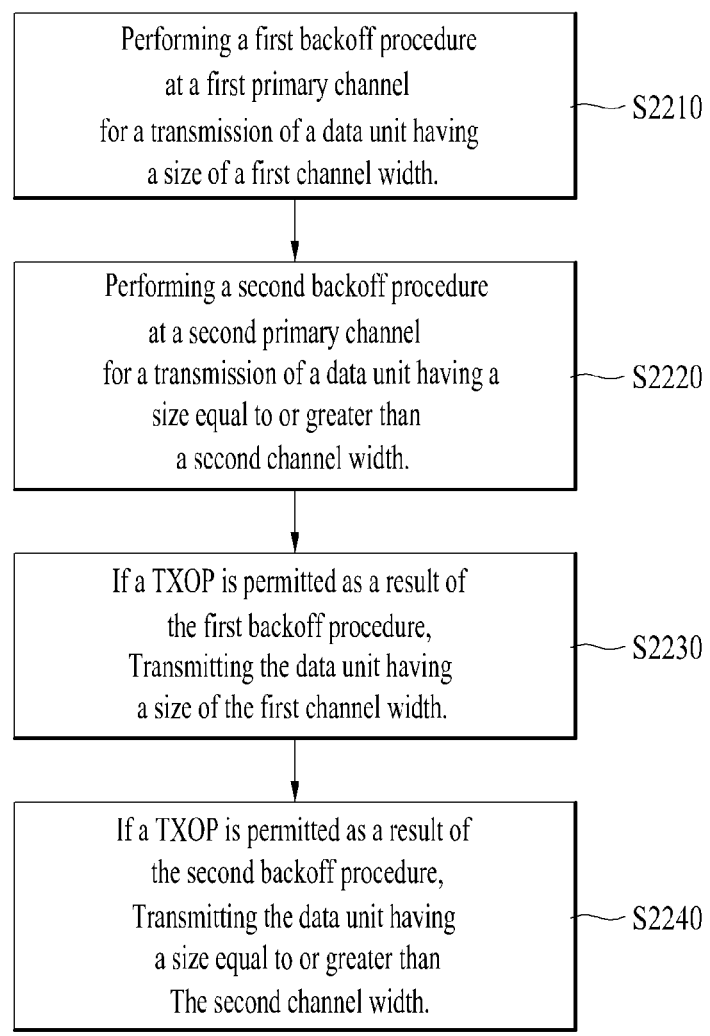
FIG. 22 illustrates a backoff method according to an example of the present invention.

FIG. 22 illustrates an exemplary backoff method according to the present invention.

In step S2210, to transmit a data unit having a size equal to a first channel width (e.g., 1 MHz) (e.g., a 1 MHz PPDU), an STA may perform a first backoff procedure on a first primary channel having the first channel width.

On the other hand, to transmit a data unit having a size equal to or greater than a second channel width (e.g., 2 MHz or above) (e.g., a 2, 4, 8, or 16 MHz PPDU), the STA may perform a second backoff procedure on a second primary channel having the second channel width in step S210.

If a TXOP is allowed for the STA as a result of step S2210, the STA may transmit the data unit having the first channel width (e.g. the 1 MHz PPDU) in step S2230. If a TXOP is allowed for the STA as a result of step S2210, the STA is allowed to transmit only the data unit having the first channel width (e.g. the 1 MHz PPDU), not a data unit (e.g., a 2 MHz PPDU) having a larger channel width than the first channel width.

If a TXOP is allowed for the STA as a result of step S2210, the STA is allowed to transmit the data unit having the second channel width (e.g., 2 MHz) or above (e.g. a 2, 4, 8, or 16 MHz PPDU). For example, if a 2-MHz second secondary channel, a 4-MHz second secondary channel, and an 8-MHz second secondary channel are idle during a PIFS shortly before the TXOP starts, the STA may transmit a 16 MHz PPDU. If the 2-MHz second secondary channel and the 4-MHz second secondary channel are idle during the PIFS shortly before the TXOP starts, the STA may transmit a 8 MHz PPDU. If the 2-MHz second secondary channel is idle during the PIFS shortly before the TXOP starts, the STA may transmit 4 2 MHz PPDU. In any other case, a 2 MHz PPDU may be transmitted.

While the exemplary method illustrated in FIG. 22 is represented as a series of steps for simplicity of description, this does not limit the sequence of the steps. When needed, some steps may be performed at the same time or in a different order. Further, all of the steps illustrated in FIG. 22 are not necessary to implement the proposed method of the present invention.

The method of the present invention illustrated in FIG. 22 may be performed by implementing the foregoing various embodiments of the present invention independently or in combination of two or more.

Figure 23:
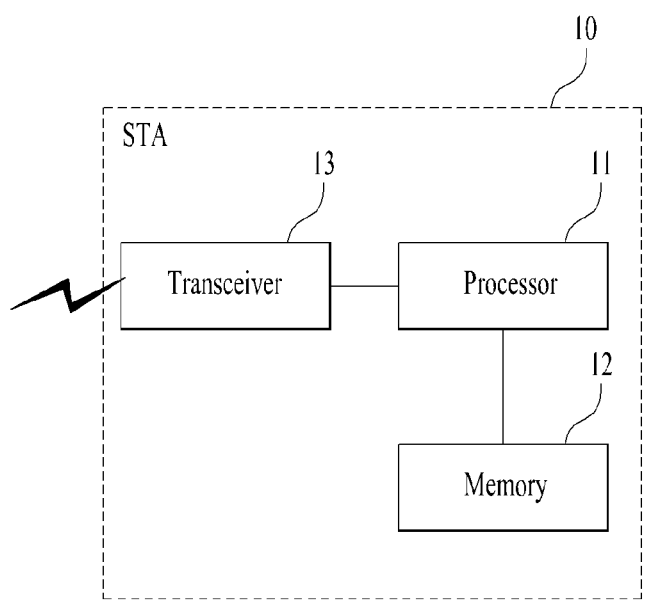
FIG. 23 is a block diagram of a wireless apparatus according to an embodiment of the present invention.

FIG. 23 is a block diagram of a wireless apparatus according to an embodiment of the present invention.

An STA 10 may include a processor 11, a memory 12, and a transceiver 13. The transceiver 13 may transmit/receive a wireless signal, for example, implement the physical layer of an IEEE 802 system. The processor 11 is connected to the transceiver 13 and implements the physical layer and/or the MAC layer of the IEEE 802 system. The processor 11 may be configured to perform operations according to the foregoing various embodiments of the present invention. Further, a module for performing operations according to the various embodiments of the present invention may be stored in the memory 12 and executed by the processor 11. The memory 12 may be included inside or outside the processor 11 and connected to the processor 11 by a known means.

In FIG. 23, the STA 10 may be configured to perform backoff in an environment in which two or more primary channels are established. To transmit a data unit having a size equal to a first channel width (e.g., 1 MHz) (e.g., a 1-MHz PPDU), the processor 11 may be configured to perform a first backoff procedure on a first primary channel. To transmit a data unit having a size equal to or greater than a second channel width (e.g., 2 MHz) (e.g., a 2, 4, 8, or 16-MHz PPDU), the processor 11 may be configured to perform a second backoff procedure on a second primary channel. If a TXOP is allowed as a result of the first backoff procedure, the processor 11 may be configured to transmit the data unit having the first channel width through the transceiver 13. If a TXOP is allowed as a result of the second backoff procedure, the processor 11 may be configured to transmit the data unit having the second channel width or larger through the transceiver 13.

The specific configuration of the above-described apparatus may be implemented so that the foregoing various embodiments of the present invention may be applied independently or two or more of them may be applied simultaneously. To avoid redundancy, the same description is not provided herein.

The embodiments of the present invention may be implemented by various means, for example, in hardware, firmware, software, or a combination thereof.

In a hardware configuration, the methods according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the various embodiments of the present invention have been described in the context of an IEEE 802.11 system, the present invention is also applicable to various mobile communication systems.

What is claimed is:

1. A method for performing backoff by a STAtion (STA) in a Wireless Local Area Network (WLAN) system, the method comprising:
performing a first backoff procedure on a first primary channel having a first channel width or a second backoff procedure on a second primary channel having a second channel width according to a size of a data unit to be transmitted,
wherein the second channel width is greater than the first channel width and the first primary channel is included in the second primary channel,
wherein when the size of the data unit to be transmitted is equal to the first channel width, the method further comprises:
performing the first backoff procedure on the first primary channel, and
transmitting the data unit when a Transmission Opportunity (TXOP) is allowed as a result of the first backoff procedure, and
wherein when the size of the data unit to be transmitted is equal to or greater than the second channel width, the method further comprises:
performing the second backoff procedure on the second primary channel, and
transmitting the data unit when a TXOP is allowed as a result of the second backoff procedure.

2. The method according to claim 1, wherein the first channel width is 1 MHz.

3. The method according to claim 2, wherein when the TXOP is allowed as a result of the first backoff procedure, the data unit of 1 MHz is transmitted on the first primary channel.

4. The method according to claim 1,
wherein the second channel width is 2 MHz, and
wherein when the TXOP is allowed as a result of the second backoff procedure, a data unit of 2 MHz is transmitted on the second primary channel.

5. The method according to claim 1,
wherein the second channel width is 2 MHz, and
wherein when the TXOP is allowed as a result of the second backoff procedure and a secondary channel of 2 MHz is idle during a Point Coordination Function (PCF) Interframe Space (PIFS) shortly before the start of the TXOP, a data unit of 4 MHz is transmitted on the second primary channel and the secondary channel of 2 MHz.

6. The method according to claim 1,
wherein the second channel width is 2 MHz, and
wherein when the TXOP is allowed as a result of the second backoff procedure and both a secondary channel of 2 MHz and a secondary channel of 4 MHz are idle during a PIFS shortly before the start of the TXOP, a data unit of 8 MHz is transmitted on the second primary channel of 2 MHz, the secondary channel of 2 MHz, and the secondary channel of 4 MHz.

7. The method according to claim 1, wherein when a backoff timer value reaches 0 during the first backoff procedure, the TXOP is allowed as a result of the first backoff procedure.

8. The method according to claim 1, wherein when a backoff timer value reaches 0 during the second backoff procedure, the TXOP is allowed as a result of the second backoff procedure.

9. The method according to claim 1, wherein the STA is a Sub 1 GHz (S1G) STA.

10. The method according to claim 1, wherein the data unit is a Physical Layer Convergence Protocol (PLCP) packet data unit.

11. A STAtion (STA) for performing backoff in a Wireless Local Area Network (WLAN) system, the STA comprising:
a transceiver; and
a processor,
wherein the processor performs a first backoff procedure on a first primary channel having a first channel width or a second backoff procedure on a second primary channel having a second channel width according to a size of a data unit to be transmitted,
wherein the second channel width is greater than the first channel width and the first primary channel is included in the second primary channel,
wherein when the size of the data unit to be transmitted is equal to the first channel width,
the processor performs the first backoff procedure on the first primary channel, and
the processor controls the transceiver to transmit the data unit when a Transmission Opportunity (TXOP) is allowed as a result of the first backoff procedure, and
wherein when the size of the data unit to be transmitted is equal to or greater than the second channel width,
the processor performs the second backoff procedure on the second primary channel, and
the processor controls the transceiver to transmit the data unit when a TXOP is allowed as a result of the second backoff procedure.

* * * * *